(12) United States Patent
Känsäkoski et al.

(10) Patent No.: US 7,339,977 B2
(45) Date of Patent: Mar. 4, 2008

(54) SIGNAL STRENGTH ASSISTED SEARCHER AND ACQUISITION

(75) Inventors: Antti Känsäkoski, San Diego, CA (US); Tom Kenney, San Diego, CA (US); Jean-Marie Tran, San Diego, CA (US); Judy Xu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1341 days.

(21) Appl. No.: 09/893,143

(22) Filed: Jun. 27, 2001

(65) Prior Publication Data

US 2003/0002563 A1 Jan. 2, 2003

(51) Int. Cl.
*H04B 1/69* (2006.01)
(52) U.S. Cl. ..................................... 375/139
(58) Field of Classification Search ............... 375/261, 375/130, 340, 136, 140, 142, 149, 150, 355, 375/359, 367, 345, 317, 343
See application file for complete search history.

(56) References Cited

U.S. PATENT DOCUMENTS

| | | | | |
|---|---|---|---|---|
| 5,440,597 A | 8/1995 | Chung et al. | ............... | 375/200 |
| 5,642,377 A | 6/1997 | Chung et al. | ............... | 375/200 |
| 5,794,153 A * | 8/1998 | Ariyavisitakul et al. | .... | 455/507 |
| 6,078,570 A | 6/2000 | Czaja et al. | ............... | 370/331 |
| 6,434,186 B2 * | 8/2002 | Dowling | ............... | 375/147 |
| 6,463,295 B1 * | 10/2002 | Yun | ............... | 455/522 |
| 6,510,143 B1 * | 1/2003 | Bejjani et al. | ............... | 370/320 |
| 6,563,891 B1 * | 5/2003 | Eriksson et al. | ............... | 375/345 |
| 6,577,608 B1 * | 6/2003 | Moon et al. | ............... | 370/311 |
| 6,700,922 B2 * | 3/2004 | Challa et al. | ............... | 375/147 |
| 6,795,422 B2 * | 9/2004 | Ohsuge | ............... | 370/342 |
| 2001/0009562 A1 * | 7/2001 | Ohno | ............... | 375/148 |
| 2002/0123319 A1 * | 9/2002 | Peterzell | ............... | 455/296 |
| 2002/0150068 A1 * | 10/2002 | Orr et al. | ............... | 370/335 |
| 2002/0181632 A1 * | 12/2002 | Kang et al. | ............... | 375/354 |

OTHER PUBLICATIONS

Rick et al. "Parallel Acquisition in Mobile DS-CDMA Systems", IEEE Transactions on Communications, vol. 45, No. 11. Nov. 1997, pp. 1466-1476.*

* cited by examiner

*Primary Examiner*—Khai Tran
(74) *Attorney, Agent, or Firm*—Harrington & Smith, PC

(57) ABSTRACT

A code division, multiple access (CDMA) receiver includes an RF section for receiving a CDMA signal through a channel; a circuit for determining an instantaneous total received power (Io) of the received CDMA signal; and a searcher that is one of enabled for operation or disabled from operation in accordance with value of Io. The circuit includes a comparator for comparing Io against a threshold, and for generating a searcher trigger signal only when Io exceeds the threshold or, preferably, for generating the searcher trigger signal if Io does not exceed the threshold, within some predetermined period of time.

33 Claims, 4 Drawing Sheets

SIGNAL STRENGTH ASSISTED SEARCHER AND ACQUISITION

TECHNICAL FIELD

These teachings relate generally to wireless communications systems and methods and, more specifically, these teachings relate to spread spectrum, code division, multiple access (CDMA) communications systems that employ a pilot channel for signal acquisition and for allocating fingers of a multi-finger correlator, such as one found in a RAKE-type of receiver.

BACKGROUND

In a spread spectrum system of interest to these teachings a pilot channel signal is transmitted from a base station or base site for reception by mobile terminals within an area served by the base station. The mobile terminal could be a cellular telephone or a PCS terminal. The received pilot signal is used by the mobile terminal in a searcher function for synchronization and system acquisition purposes, for allocating despreaders or correlators, as well as for mobile station demodulation processing of the data bearing channels. However, the pilot signal suffers from the same radio channel fading processes as does the normally transmitted signal. Due to the fading processes the signal to noise ratio (SNR) of the received pilot signal varies as a function of time and, as a result, the use of the pilot signal for its intended purposes can be impaired.

The searcher is generally used for synchronization acquisition and channel set maintenance. The synchronization acquisition procedure is intended to synchronize a local pseudo-noise (PN) generator to CDMA system time. During the set maintenance procedure the searcher identifies the multipath profile of the channel and calculates the pilot channel energy per chip to total received power spectral density ratio (Ec/Io).

A problem arises in this regard, as the searcher sample size may be, for example, 2048 chips (single dwell) or more. In this case it can be shown that several seconds may be required to compute all of the correlations and, thus, the acquisition time can be dominated by the correlation calculations.

In accordance with a conventional searcher operational procedure, a data processor of the mobile terminal may use the power measurement capabilities of an automatic gain control (AGC) block in order to determine if data stored into searcher memory (also referred to as a buffer) is subject to any fading (or other adverse) channel conditions. However, there are problems with this approach, as the response time and other characteristics of the AGC may not be optimum for use by the searcher function.

The following commonly assigned U.S. Patents are referenced for teaching various aspects of spread spectrum searcher synchronization and acquisition: U.S. Pat. No. 5,440,597, issued Aug. 8, 1995, "Double Dwell Maximum Likelihood Acquisition System With Continuous Decision Making for CDMA and Direct Spread Spectrum System", by S. Chung et al. and U.S. Pat. No. 5,642,377, issued Jun. 24, 1997, "Serial Search Acquisition System with Adaptive Threshold and Optimal Decision for Spread Spectrum Systems, by S. Chung et al. Reference can also be made to U.S. Pat. No. 6,078,570, issued Jun. 20, 2000, "Mobile Assisted Hard Hand-Off for a Code Division Multiple Access (CDMA) System", by S. Czaja et al., for teaching the use of pilot channel signal strength measurements and automatic gain control (AGC) in the context of mobile terminal hand-offs. The disclosures of these commonly assigned U.S. patents are incorporated by reference herein in their entireties.

SUMMARY

The foregoing and other problems are overcome by methods and apparatus in accordance with embodiments of these teachings.

A code division, multiple access (CDMA) receiver includes an RF section for receiving a CDMA signal through a channel; a circuit for determining an instantaneous total received power (Io) of the received CDMA signal; and a searcher that is one of enabled for operation or disabled from operation in accordance with the value of Io. The circuit includes a comparator for comparing Io against a threshold, and for generating a searcher trigger signal only when Io exceeds the threshold or, preferably, if Io does not exceed the threshold, within some predetermined period of time.

The searcher includes a searcher buffer for storing Inphase and Quadrature (I/Q) samples, and in one embodiment the searcher is responsive to a trigger signal generated by the circuit for storing I/Q samples into the buffer. The circuit operates to accumulate n symbol power samples, to scale the n accumulated symbol power samples, and to compare the scaled symbol power samples to a reference value, If the scaled symbol power value is above the reference value, the circuit generates the trigger for the searcher to cause the searcher to begin storing the Inphase and Quadrature (I/Q) samples into the searcher buffer. If the scaled symbol power value is below the reference value, the circuit iterates, that is, it repeats the process of accumulating, scaling and comparing the signal power samples, and if the scaled symbol power value does not exceed the reference value after x repetitions, generates the trigger for the searcher to cause the searcher to begin storing the I/Q samples into the searcher buffer.

In another, more preferred embodiment the Inphase and Quadrature (I/Q) samples are stored into the searcher buffer while the Io calculation is performed. In this embodiment, and if the trigger signal is generated, the searcher buffer already contains I/Q samples that are ready to be processed by the searcher. In this case the generation of the trigger signal initiates the processing of I/Q samples stored in the searcher buffer. As with the first described embodiment, if the scaled symbol power value does not exceed the reference value after x repetitions the trigger signal is generated and causes, in this embodiment, the searcher to begin processing the stored I/Q samples.

In a further embodiment the I/Q samples are stored and the Io calculations are done on the fly.

In a further embodiment the I/Q samples are stored in the searcher buffer, and the trigger is used to selectively identify a portion of the searcher buffer that stores samples corresponding to the maximum instantaneous Io.

The performance of the searcher using the Io trigger and timing window in accordance with these teachings has been found to be improved at all vehicle speeds. The performance of the searcher at certain speeds may be further improved by decreasing the AGC constant or by increasing Io detector times. Also, the use of vehicle speed detection may improve the performance of the searcher.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

By way of introduction, these teachings use instantaneous power measurement information (Io), as opposed to measured Received Signal Strength Indicator (RSSI) information from an AGC block, to optimize the searcher data acquisition operation. In the searcher data acquisition algorithm (as well as during set maintenance), the instantaneous measured Io and an appropriate time window are used as a trigger in the searcher operations. Note that the details of the searcher algorithm per se are not particularly germane to an understanding of these teachings, and any one of a number of searcher algorithms could be used, including those referenced above in the commonly assigned U.S. patents.

Figure 1:
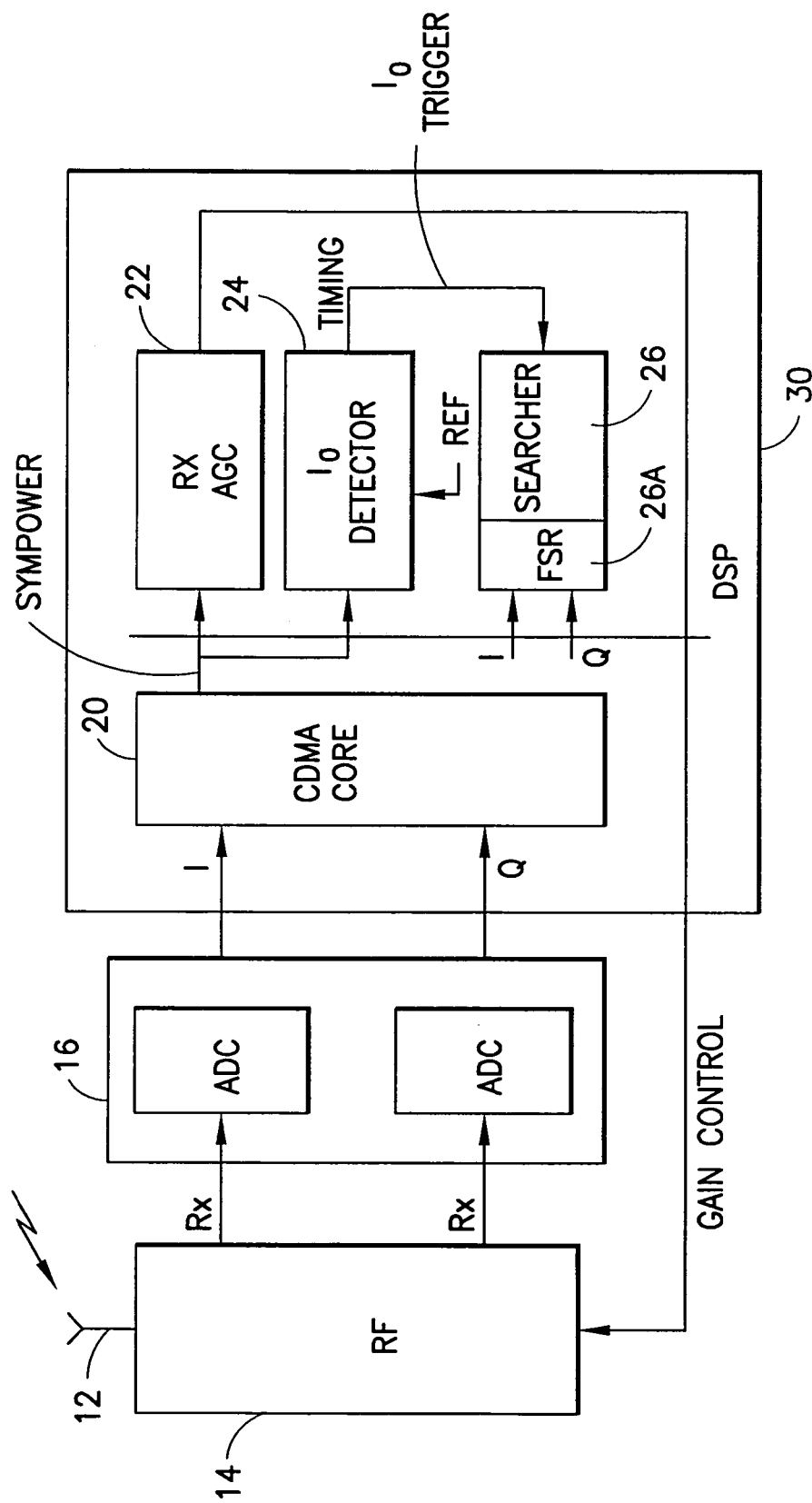
FIG. 1 is a block diagram of a spread spectrum receiver that is constructed and operated in accordance with these teachings.

FIG. 1 shows a receiver portion of a mobile terminal 10, specifically an antenna 12 coupled to an RF section or block 14. Outputs of the RF block 14 are digitized by analog-to-digital converters (ADCs) 16 and provided as Inphase (I) and Quadrature (Q) channel signals to a CDMA core unit 20. A symbol power (SymPower) output of the CDMA core unit 20 is input to a receive AGC (RX_AGC) block 22 and to an Io detector 24. The RX-AGC block 22 feeds a gain control signal back to the RF block 14 in a conventional manner. A searcher block 26 also receives the I and Q signals as inputs. In accordance with an aspect of these teachings, the Io detector 24 outputs a timing (trigger) signal to the searcher block 26, as will be described in greater detail below. The RX_AGC block 22, the Io detector 24 and the searcher 26 may all be implemented by a suitably programmed digital signal processor (DSP) 30, or these functions could be implemented using dedicated hardware.

The following discussion is made in the context of certain specific parameters having certain values or ranges of values. It is to be understood that these are exemplary of the practice of these teachings, and are not intended to be construed in a limiting sense upon the practice of these teachings.

A minimum requirement for the CDMA mobile receiver 10 to receive a CDMA signal may be from levels −104 dBm to −25 dBm. The CDMA RX_AGC block 22 is designed to maintain the input signal at a constant level at the input of the ADCs 16 by controlling various gains in the RF unit 14, such as the gain of a low noise amplifier (LNA). The time constant of the RX_AGC block 22 is set so as to allow compensation of slow fading, but not fast fading. However, the inventors have realized that the symbol power (SymPower) output from the CDMA core 20 to the RX_AGC block 22 can provide nearly instantaneous channel information for a communication channel that is in a rapid fade, i.e., one that would not normally be compensated for by the AGC block 22 gain control signal. In this case, Io can be used, in one embodiment, to trigger the loading of data into a Fast Searcher RAM (FSR) 26A, associated with the searcher (correlator) 26, in order to improve the performance of the acquisition and set maintenance operations.

In a fading channel, and if Io always indicates "fading", it is instead preferred to delay the operation of the searcher 26. However, an appropriate timing window is required in order to force the searcher 26 to operate, if required, in order to limit the acquisition time. In this case a compromise is preferably made between the acquisition performance and the acquisition time.

In general, it is desirable to reduce the delay due to repetitions of the trigger generation algorithm versus fading. A small delay, leading to an improved acquisition time, and depending on vehicle speed, can lead to greatly improved performance, when measured in terms of detection probability.

In the preferred embodiment, and by example, eight SymPower samples (0.42 ms) are accumulated by the Io detector 24 in order to obtain Io, and the maximum Io monitoring time can be less than about 10 milliseconds. In this case the acquisition time, resulting from the use of these teachings, can become shortened to the point that it may be ignored.

Figure 2A:
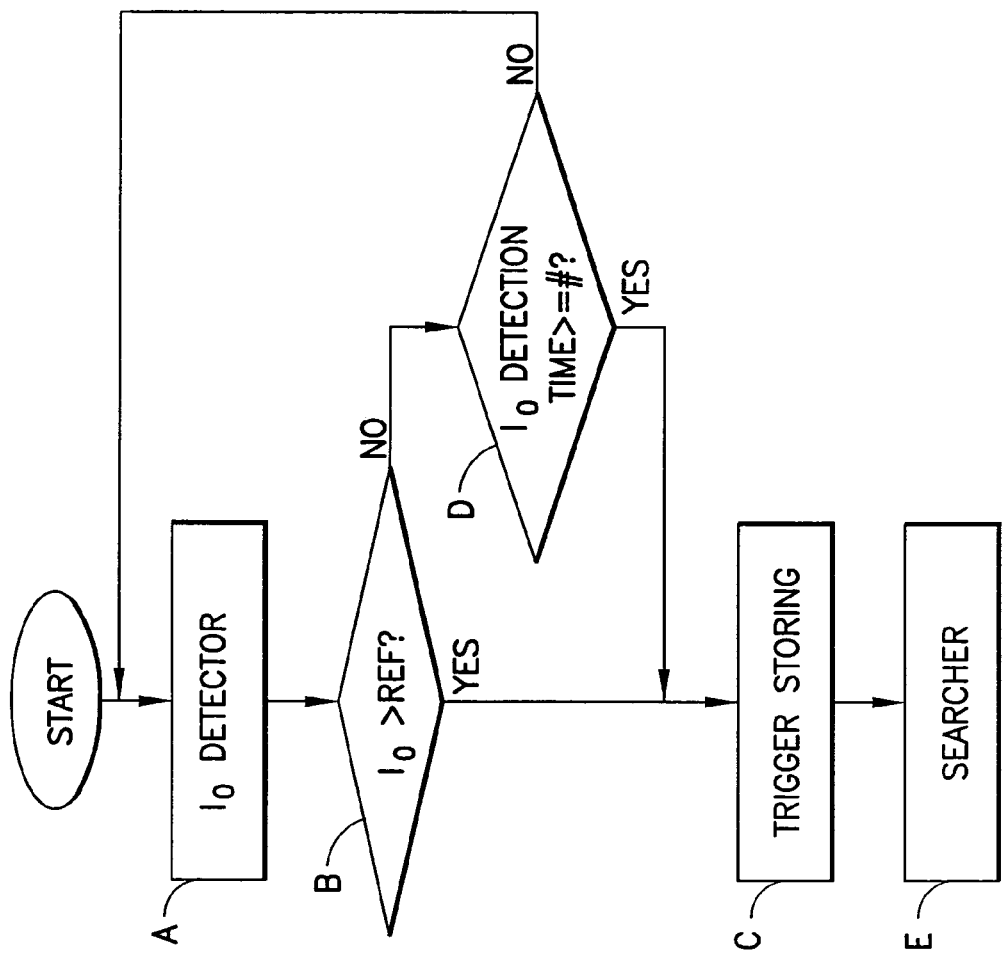
FIG. 2A is a logic flow diagram useful in explaining an Io trigger and timing window algorithm is accordance with a first embodiment of these teachings.

In FIG. 1 the received R×I and R×Q samples are squared and summed ($I^2+Q^2$), and then integrated two samples per chip over a 64 chip period in the CDMA core 20. Referring also to the logic flow diagram of FIG. 2A, the DSP 30 reads the integrated signal power, SymPower, every symbol at a 19.2 KHz rate. At Block A the Io detector 24 accumulates n SymPower samples, and the accumulated value of SymPower is scaled and then compared to a reference signal value used in the RX_AGC 22, such as a value used to control the AGC gain. At Block B the comparison is made, and if the scaled SymPower value is above the reference value, the searcher 26 I/Q storing process is triggered at Block C. If the scaled SymPower is below the reference value, the Io detector 24 runs again and repeats the above comparison and trigger procedure, via Block D. In Block D the searcher 26 is arranged to trigger the I/Q storing process into the FSR 26A after some predetermined number (#) of repetitions of Io detection, such as five repetitions, even if the result of the Io detector 24 is still below the reference value. At Block E the searcher 26 is enabled for operation, i.e., the searcher algorithm is run, using the stored samples.

Figure 2B:
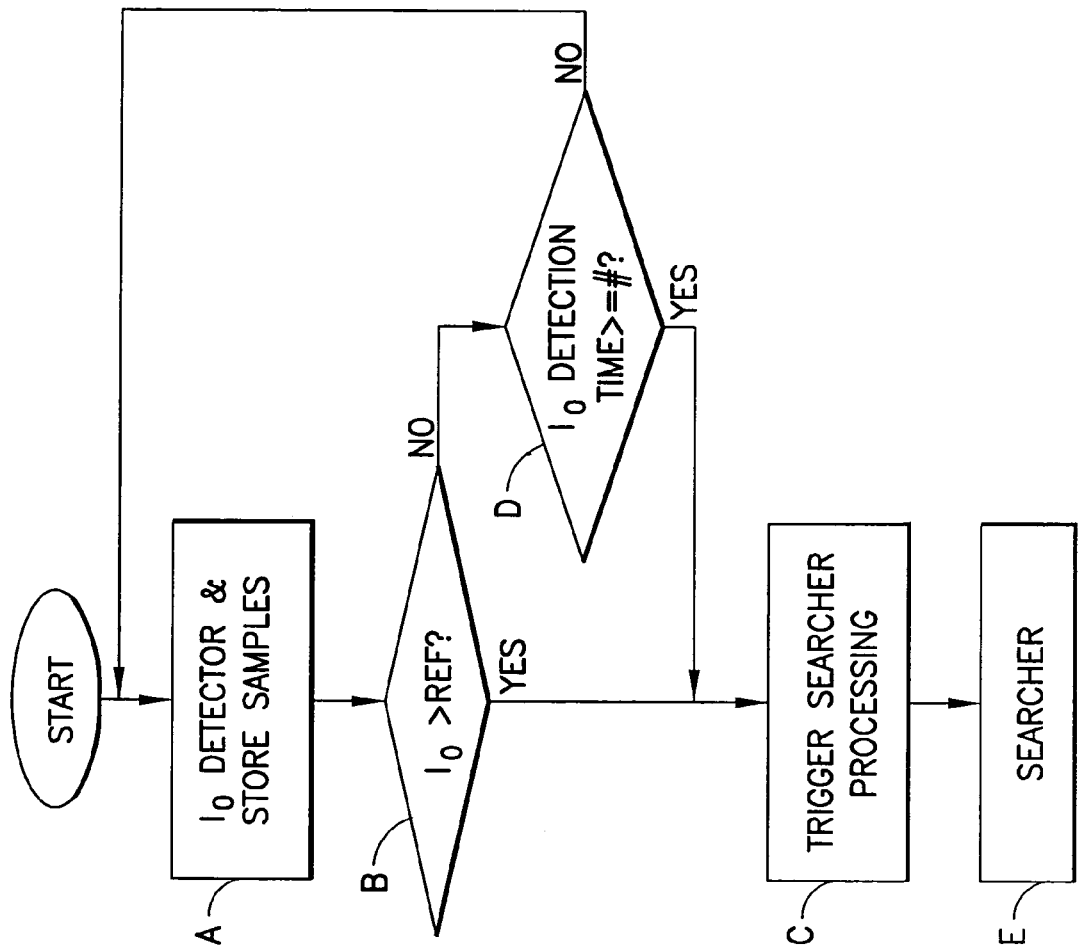
FIG. 2B is a logic flow diagram useful in explaining an Io trigger and timing window algorithm is accordance with a further embodiment of these teachings.

FIG. 2B illustrates another, more preferred method. Note that in this method Block A is modified to perform the Io calculation and to also store I/Q samples into the searcher buffer 26A, and that Block C is modified so as to trigger the processing of the I/Q samples that are stored in the searcher buffer. As with the embodiment of FIG. 2A, Block C can be reached by Io exceeding the reference value, or by the Io detection timeout occurring in Block D.

In a further embodiment of these teachings the I/Q samples may be stored in the searcher buffer 26A, and the Io trigger is then used to select a portion of the buffer 26A that stores samples corresponding to the maximum instantaneous Io. In this regard, the sum ($I^2+Q^2$) can be computed over, by example, four consecutive segments of the received signal, and the sum having the largest value can be used to identify the segment of data in the searcher buffer 26A on which the searcher 26 should be enabled for operation. That is, in this embodiment value of Io is determined over a number of samples that is less than the total size of (number of samples stored in) the searcher sample buffer 26A, and is used to select samples from only a portion of the searcher sample buffer 26A for use by the searcher 26.

Figure 3:
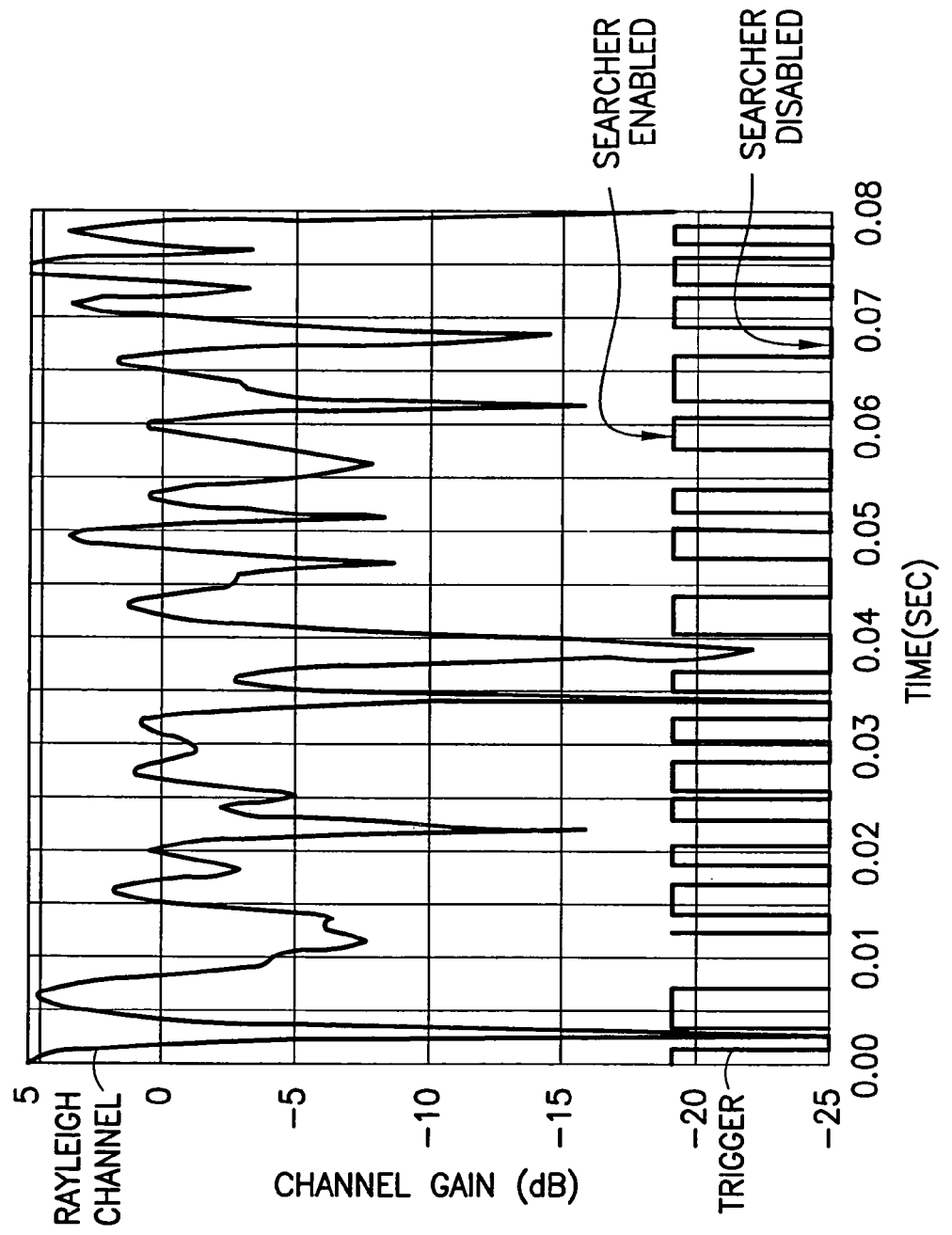
FIG. 3 illustrates an exemplary Rayleigh channel and the corresponding generation of the searcher trigger signal in accordance with these teachings.

FIG. 3 shows a Rayleigh channel and the resulting searcher trigger signal generated in accordance with these teachings. Note that the Io searcher trigger signal follows the variations in the channel, and that the trigger signal is enabled (active) only when the channel is above some level that corresponds to the above-mentioned threshold. If a fade occurs that exceeds a time required to perform the predetermined number of repetitions of the above-described algorithm, then the trigger signal is generated in any case.

The performance of the searcher 26 using the Io trigger and timing window has been found to be improved at all vehicle speeds (e.g., 3 km/h, 30 km/h, and 100 km/h). Also, the performance of the searcher 26 at certain speeds, such as 30 km/h, may be further improved by decreasing the AGC constant, or by increasing Io detector times. Also, the use of vehicle speed detection techniques may improve the performance of the searcher 26.

It should be noted that the searcher 26 may operate so as to correlate the incoming samples in parallel with the operation of the Io detector 24. In this case, if the result of the comparison performed by the Io detector 24 indicates that the channel is less than optimum (Io<ref), then the operation of the searcher 26 can be aborted, i.e., the searcher 26 is disabled from operation, and the correlation results obtained at that point are simply not used.

While these teachings have been particularly shown and described with respect to preferred embodiments thereof, it will be understood by those skilled in the art that changes in form and details may be made therein without departing from the scope and spirit of these teachings.

What is claimed is:

1. A code division, multiple access (CDMA) receiver, comprising:
   a RF section for receiving a CDMA signal;
   a circuit for determining an instantaneous total received power (Io) of the received CDMA signal; and
   a searcher that is one of enabled for operation or disabled from operation in accordance with the value of Io.

2. A CDMA receiver as in claim 1, wherein said circuit comprises a comparator for comparing Io against a threshold, and for generating a searcher trigger signal only when Io exceeds the threshold.

3. A CDMA receiver as in claim 1, wherein said circuit comprises a comparator for comparing Io against a threshold, and for generating a searcher trigger signal when Io exceeds the threshold, or if Io does not exceed the threshold, for generating the searcher trigger signal within some predetermined period of time.

4. A CDMA receiver as in claim 1, wherein said searcher comprises a searcher buffer for storing Inphase and Quadrature (I/Q) samples, and wherein said searcher is responsive to a trigger signal generated by said circuit for storing I/Q samples into said searcher buffer.

5. A CDMA receiver as in claim 1, wherein said circuit operates to accumulate n symbol power samples, to scale the n accumulated symbol power samples, and to compare the scaled symbol power samples to a reference value.

6. A CDMA receiver as in claim 5, wherein said circuit further operates, if the scaled symbol power value is above the reference value, to generate a trigger for the searcher to cause the searcher to begin storing Inphase and Quadrature (I/Q) samples into a searcher buffer.

7. A CDMA receiver as in claim 6, wherein said circuit further operates, if the scaled symbol power value is below the reference value, to repeat accumulating, scaling and comparing the signal power samples, and if the scaled symbol power value does not exceed the reference value after x iterations, to generate the trigger for the searcher to cause the searcher to begin storing I/Q samples into the searcher buffer for processing the data for acquisition or set maintenance purposes.

8. A CDMA receiver as in claim 1, wherein the value of Io is computed over numbers of samples that are less than the total size of a searcher sample buffer, and is used to select samples from only a portion of the searcher sample buffer for use by the searcher.

9. A method for operating a code division, multiple access (CDMA) receiver, comprising:
   receiving a CDMA signal;
   determining an instantaneous total received power (Io) of the received CDMA signal; and
   enabling or disabling a searcher for operation in accordance with the value of Io.

10. A method as in claim 9, wherein determining the instantaneous total received power comprises comparing Io against a threshold, and generating a searcher trigger signal only when Io exceeds the threshold.

11. A method as in claim 9, wherein determining the instantaneous total received power comprises comparing Io against a threshold, and generating a searcher trigger signal only when Io exceeds the threshold, or if Io does not exceed the threshold, generating the searcher trigger signal within some predetermined period of time.

12. A method as in claim 9, wherein the searcher includes a buffer for storing Inphase and Quadrature (I/Q) samples, and further comprising storing I/Q samples into the buffer in response to a trigger signal generated when Io exceeds a threshold, or if Io does not exceed the threshold, to a trigger signal generated within some predetermined period of time.

13. A method as in claim 9, wherein said method operates to accumulate n symbol power samples, to scale the n accumulated symbol power samples, to compare the scaled symbol power samples to a reference value, and if the scaled symbol power value is above the reference value, to generate a trigger to begin storing Inphase and Quadrature (I/Q) samples into a searcher buffer, wherein said method further operates, if the scaled symbol power value is below the reference value, to repeat accumulating, scaling and comparing the signal power samples, and if the scaled symbol power value does not exceed the reference value after x repetitions, to generate the trigger for the searcher to cause the searcher to begin storing I/Q samples into the searcher buffer.

14. A method as in claim 9, wherein the value of Io is determined over a number of samples that is less than the total size of a searcher sample buffer, and is used to select samples from only a portion of the searcher sample buffer for use by the searcher.

15. A method for operating a code division, multiple access (CDMA) receiver, comprising:
   receiving a CDMA signal;
   storing samples of the received CDMA signal into a buffer;
   determining an instantaneous total received power (Io) of the received CDMA signal over m consecutive segments of the received CDMA signal; and
   using a maximum value of Io to identify one of m segments of the buffer on which a searcher is to be enabled for operation.

16. A method for operating a code division, multiple access (CDMA) receiver, comprising:
- receiving a CDMA signal and storing samples of the received CDMA signal into a buffer of a searcher while determining an instantaneous total received power (Io) of the received CDMA signal; and
- selectively one of generating or not generating a trigger signal to the searcher in accordance with the value of Io, wherein when generated the searcher trigger signal causes the searcher to process the stored samples.

17. A method as in claim 16, wherein determining the instantaneous total received power comprises comparing Io against a threshold, and generating the searcher trigger signal only when Io exceeds the threshold.

18. A method as in claim 16, wherein determining the instantaneous total received power comprises comparing Io against a threshold, and generating the searcher trigger signal only when Io exceeds the threshold, or if Io does not exceed the threshold, generating the searcher trigger signal within some predetermined period of time.

19. A method as in claim 16, wherein the searcher buffer stores Inphase and Quadrature (I/Q) samples.

20. A method as in claim 16, wherein said method operates to accumulate n symbol power samples, to scale the n accumulated symbol power samples, to compare the scaled symbol power samples to a reference value, and if the scaled symbol power value is above the reference value, to generate the searcher trigger signal, wherein said method further operates, if the scaled symbol power value is below the reference value, to repeat accumulating, scaling and comparing the signal power samples, and if the scaled symbol power value does not exceed the reference value after some period of time, to generate the searcher trigger signal.

21. A code division, multiple access (CDMA) receiver, comprising:
- a receiver circuit for receiving a CDMA signal;
- a memory for storing samples of the received CDMA signal; and
- a signal processor circuit for determining, during a time that the samples are being stored in said memory, an instantaneous total received power (Io) of the received CDMA signal for selectively one of generating or not generating a searcher trigger signal in accordance with the value of Io, wherein when generated the searcher trigger signal causes the searcher to process the stored samples.

22. A CDMA receiver as in claim 21, wherein said signal processor circuit, when determining the instantaneous total received power, compares Io against a threshold, and generates the searcher trigger signal only when Io exceeds the threshold.

23. A CDMA receiver as in claim 21, wherein said signal processor circuit, when determining the instantaneous total received power, compares Io against a threshold, and generates the searcher trigger signal when Io exceeds the threshold, or if Io does not exceed the threshold, generates the searcher trigger signal within some predetermined period of time.

24. A CDMA receiver as in claim 21, wherein said memory stores Inphase and Quadrature (I/Q) samples.

25. A CDMA receiver as in claim 21, wherein said signal processor circuit operates to accumulate n symbol power samples, to scale the n accumulated symbol power samples, to compare the scaled symbol power samples to a reference value, and if the scaled symbol power value is above the reference value, generates the searcher trigger signal, wherein if the scaled symbol power value is below the reference value, said signal processor circuit repeats accumulating, scaling and comparing the signal power samples, and if the scaled symbol power value does not exceed the reference value after some period of time, generates the searcher trigger signal.

26. A radio frequency (RF) receiver, comprising:
- means for receiving a RF signal;
- means for determining an instantaneous total received power (Io) of the received RF signal; and
- means for one of enabling a searcher means for operation or disabling the searcher means from operation in accordance with the value of Io.

27. A RF receiver as in claim 26, where said enabling means comprises comparator means for comparing Io against a threshold, and for generating a searcher means trigger signal only when Io exceeds the threshold.

28. A RF receiver as in claim 27, where said enabling means is responsive to Io not exceeding the threshold within some predetermined period of time, for generating the searcher means trigger signal.

29. A RF receiver as in claim 26, where the value of Io is determined over numbers of samples that are less than a total size of a searcher means sample buffer means, and further comprising means to select samples from only a portion of the sample buffer means for use by the searcher means.

30. A method for operating a radio frequency (RF) receiver, comprising:
- a step for receiving a RF signal;
- a step for determining an instantaneous total received power (Io) of the received RF signal; and
- a step for selectively one of enabling or disabling a searcher for operation in accordance with the value of Io.

31. A method as in claim 30, where the step for determining the instantaneous total received power comprises comparing Io against a threshold, and generating a searcher trigger signal only when Io exceeds the threshold.

32. A method as in claim 31, where the step for determining the instantaneous total received power further comprises, if Io does not exceed the threshold within some predetermined period of time, a step for generating the searcher trigger signal.

33. A method as claim 30, where the step for determining the instantaneous total received power determines the value of Io over numbers of samples that are less than a total size of a sample buffer, and further comprising a step for selecting samples from only a portion of the sample buffer for use by the searcher.

* * * * *